United States Patent
Su et al.

(10) Patent No.: US 11,067,865 B1
(45) Date of Patent: Jul. 20, 2021

(54) DISPLAY APPARATUS

(71) Applicant: Au Optronics Corporation, Hsinchu (TW)

(72) Inventors: Chih-Chung Su, Hsinchu (TW); Shin-Shueh Chen, Hsinchu (TW); Yi-Wei Chen, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/148,565

(22) Filed: Jan. 14, 2021

(30) Foreign Application Priority Data

Aug. 31, 2020 (TW) .................................. 109129712

(51) Int. Cl.
| | |
|---|---|
| *G02F 1/1368* | (2006.01) |
| *G02F 1/1362* | (2006.01) |
| *G02F 1/1333* | (2006.01) |

(52) U.S. Cl.
CPC ........ *G02F 1/1368* (2013.01); *G02F 1/13338* (2013.01); *G02F 1/136209* (2013.01); *G02F 1/136222* (2021.01); *G02F 1/136227* (2013.01)

(58) Field of Classification Search
None
See application file for complete search history.

(56) References Cited

U.S. PATENT DOCUMENTS

| | | | |
|---|---|---|---|
| 8,698,144 B2 * | 4/2014 | Jeon ...................... | G06F 3/0412 257/59 |
| 10,810,396 B2 | 10/2020 | Jia et al. | |
| 2018/0165496 A1 * | 6/2018 | Cheng ................ | H01L 27/3227 |
| 2019/0005295 A1 | 1/2019 | Jia et al. | |

FOREIGN PATENT DOCUMENTS

| | | |
|---|---|---|
| CN | 106611170 | 5/2017 |
| CN | 109147593 | 1/2019 |

* cited by examiner

*Primary Examiner* — Richard H Kim
(74) *Attorney, Agent, or Firm* — JCIPRNET (57) ABSTRACT

A display apparatus includes a first substrate, a second substrate, a display medium, a pixel structure, a read-out transistor, a first insulating layer, a light-sensing structure, and a color filter pattern. The display medium is disposed between the first substrate and the second substrate. The pixel structure is disposed between the display medium and the first substrate. The read-out transistor has a semiconductor pattern and a control terminal. The light-sensing structure is disposed between the second substrate and the display medium, and is electrically connected to the read-out transistor. The first insulating layer is disposed between the semiconductor pattern and the control terminal of the read-out transistor. The color filter pattern is disposed between the second substrate and the display medium. The first insulating layer has an opening located outside the light-sensing structure, and the color filter pattern fills the opening of the first insulating layer.

18 Claims, 10 Drawing Sheets

DISPLAY APPARATUS

CROSS-REFERENCE TO RELATED APPLICATION

This application claims the priority benefit of Taiwan application serial no. 109129712, filed on Aug. 31, 2020. The entirety of the above-mentioned patent application is hereby incorporated by reference herein and made a part of this specification.

BACKGROUND

Technical Field

The disclosure relates to a display apparatus.

Description of Related Art

Nowadays, it has become a trend to equip electronic devices (such as mobile phones) with biometric technologies to enhance privacy and data protection. Common biometric technologies include ultrasonic fingerprint recognition, optical fingerprint recognition, capacitive fingerprint recognition, and face recognition. Among them, the optical fingerprint sensing technology can be easily integrated into the manufacturing process of a display panel, in which a sensing element layer is used to detect the beam reflected by the fingerprint to obtain an image of the fingerprint. However, when the sensing element layer is integrated into the display panel, the display beam used to display images needs to pass through the sensing element layer before reaching the human eyes, which may cause the white point coordinates of the display panel to shift.

SUMMARY

The disclosure provides a display apparatus with good performance.

The disclosure provides another display apparatus with good performance.

A display apparatus according to an embodiment of the disclosure includes a first substrate, a second substrate, a display medium, a pixel structure, a read-out transistor, a first insulating layer, a light-sensing structure, and a color filter pattern. The second substrate is disposed opposite to the first substrate. The display medium is disposed between the first substrate and the second substrate. The pixel structure is disposed between the display medium and the first substrate. The read-out transistor is disposed between the second substrate and the display medium. The read-out transistor has a semiconductor pattern and a control terminal. The first insulating layer is disposed between the semiconductor pattern of the read-out transistor and the control terminal of the read-out transistor. The light-sensing structure is disposed between the second substrate and the display medium, and is electrically connected to the read-out transistor. The color filter pattern is disposed between the second substrate and the display medium. The first insulating layer has an opening located outside the light-sensing structure, and the color filter pattern fills the opening of the first insulating layer.

A display apparatus according to another embodiment of the disclosure includes a first substrate, a second substrate, a display medium, a pixel structure, a read-out transistor, a first insulating layer, a light-sensing structure, and a color filter pattern. The second substrate is disposed opposite to the first substrate. The display medium is disposed between the first substrate and the second substrate. The pixel structure is disposed between the display medium and the first substrate. The read-out transistor is disposed between the second substrate and the display medium. The read-out transistor has a semiconductor pattern and a control terminal. The first insulating layer is disposed between the semiconductor pattern and the control terminal of the read-out transistor. The light-sensing structure is disposed between the second substrate and the display medium, and is electrically connected to the read-out transistor. The color filter pattern is disposed between the first substrate and the display medium. The first insulating layer has an opening located outside the light-sensing structure, and the color filter pattern overlaps the opening of the first insulating layer.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Reference will now be made to the exemplary embodiments of the disclosure, and examples of the exemplary embodiments are illustrated in the accompanying drawings. The same reference numerals are used in the drawings and descriptions to denote the same or similar parts where appropriate.

It should be understood that when an element such as a layer, film, region or substrate is referred to as being "on" or "connected to" another element, it can be directly on or connected to another element, or intervening elements may also be present. In contrast, when an element is referred to as being "directly on" or "directly connected to" another element, there are no intervening elements present. As used herein, the term "connected" may refer to physically connected and/or electrically connected. Besides, the term "electrically connected to" or "coupled" means that there may exist other intervening elements between two elements.

The term "about," "approximately," "essentially," or "substantially" as used herein is inclusive of the stated value and means within an acceptable range of deviation for the particular value as determined by persons of ordinary skill in the art, considering the measurement in question and the error associated with measurement of the particular quantity (i.e., the limitations of the measurement system). For example, "about" may mean within one or more standard deviations, or within, for example, ±30%, ±20%, ±10%, ±5% of the stated value. Moreover, a relatively acceptable range of deviation or standard deviation may be chosen for the term "about," "approximately," or "substantially" as used herein based on optical properties, etching properties or other properties, instead of applying one standard deviation across all the properties.

Unless otherwise defined, all terms (including technical and scientific terms) used herein have the same meaning as commonly understood by persons of ordinary skill in the art. It will be further understood that terms, such as those defined in commonly used dictionaries, should be interpreted as having a meaning that is consistent with their meaning in the context of the relevant art and the disclosure and will not be interpreted in an idealized or overly formal sense unless expressly so defined herein.

Figure 1:
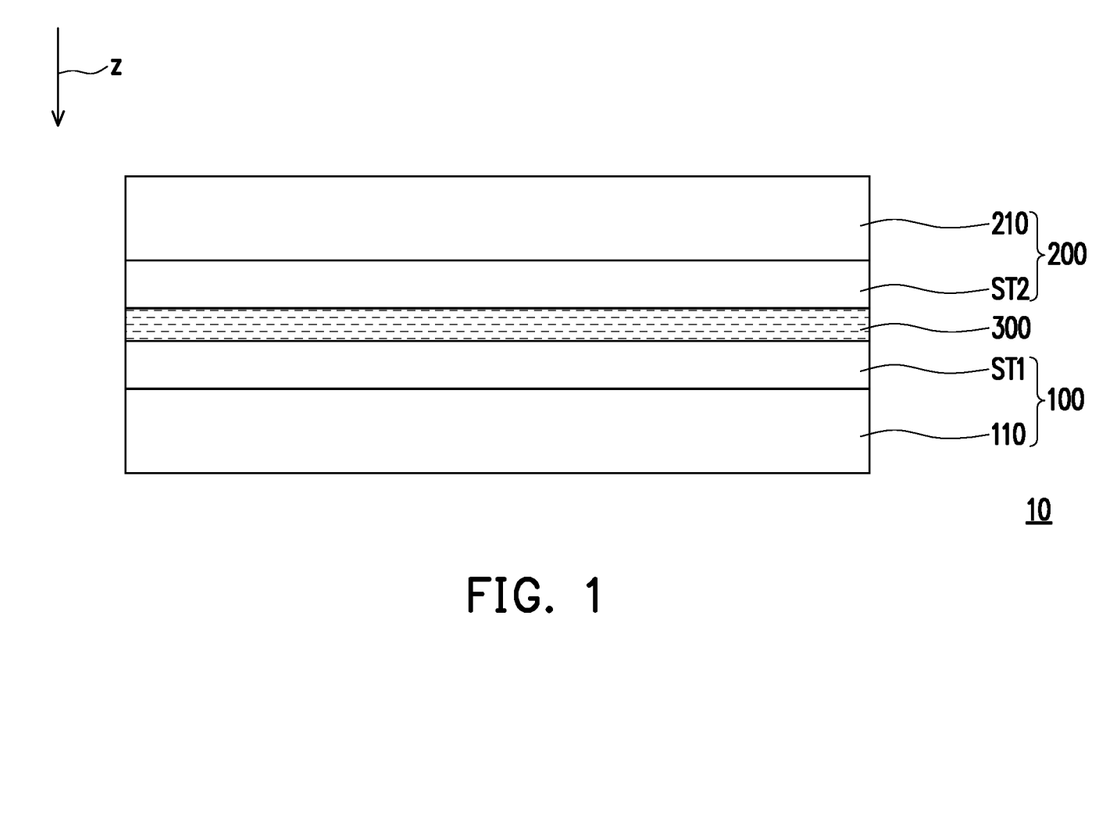
FIG. 1 is a schematic cross-sectional view of a display apparatus 10 according to an embodiment of the disclosure.

FIG. 1 is a schematic cross-sectional view of a display apparatus 10 according to an embodiment of the disclosure.

Figure 2:
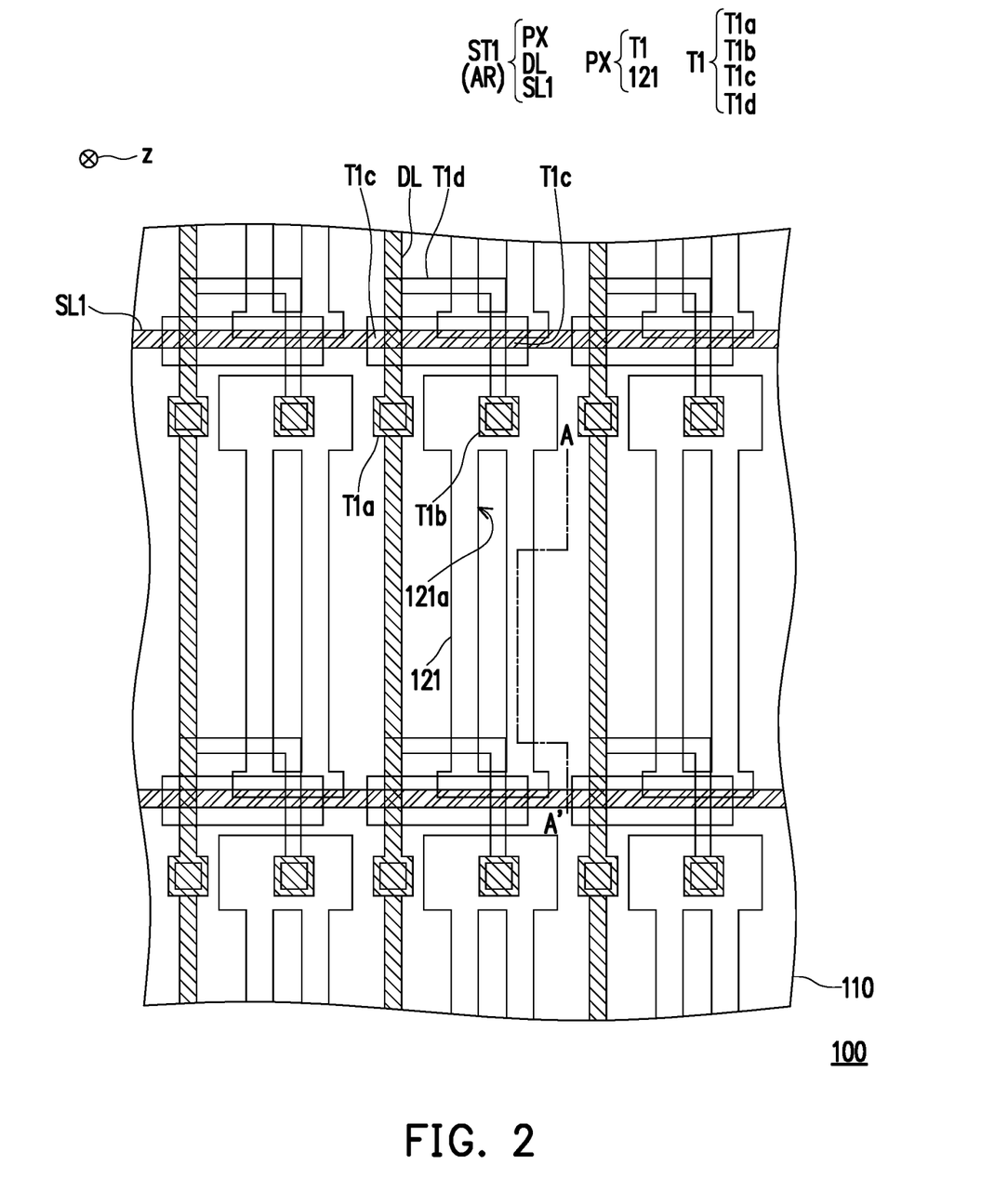
FIG. 2 is a schematic top perspective view of a pixel array substrate 100 of the display apparatus 10 according to an embodiment of the disclosure.

FIG. 2 is a schematic top perspective view of a pixel array substrate 100 of the display apparatus 10 according to an embodiment of the disclosure.

Figure 3:
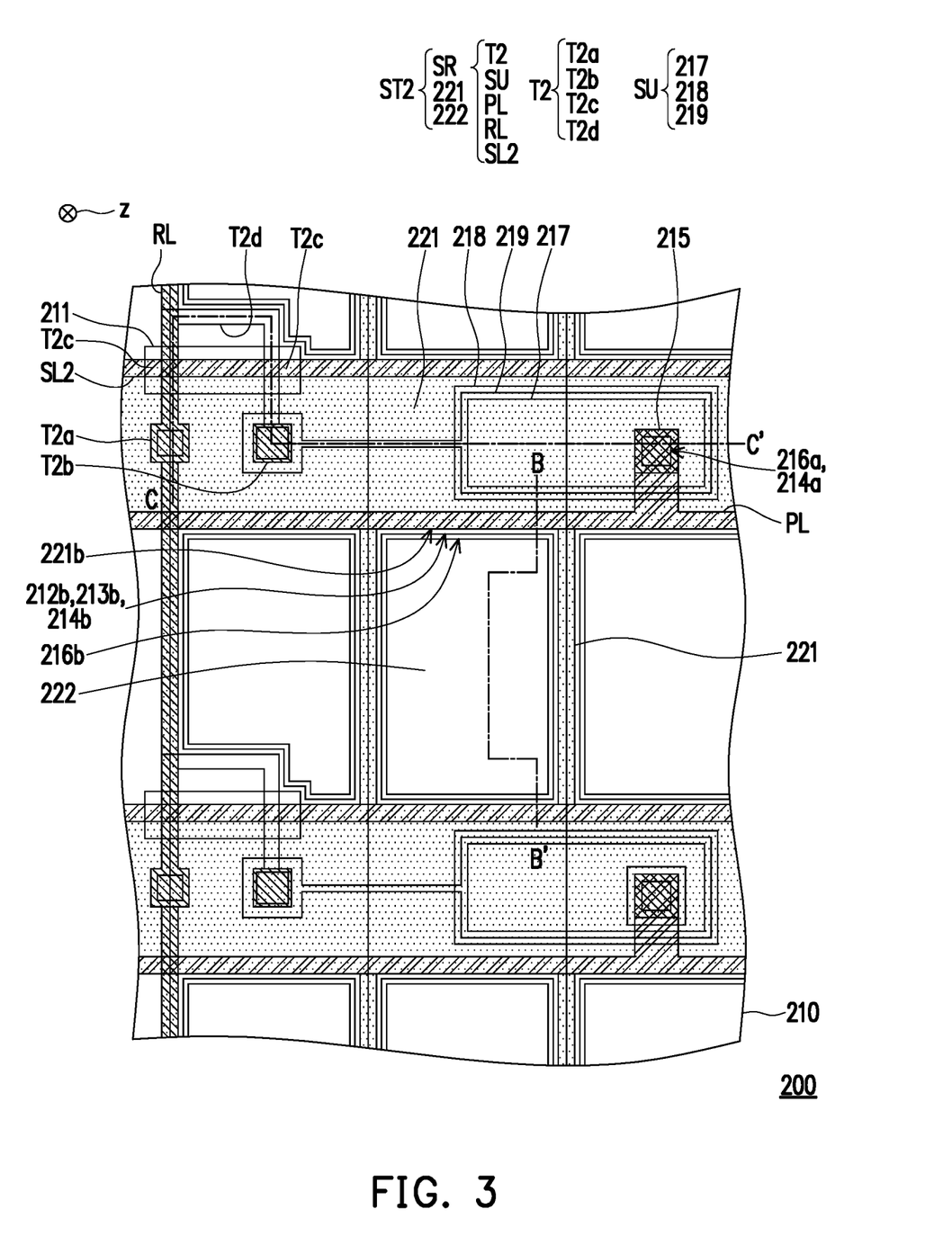
FIG. 3 is a schematic top perspective view of a sensing substrate 200 of the display apparatus 10 according to an embodiment of the disclosure.

FIG. 3 is a schematic top perspective view of a sensing substrate 200 of the display apparatus 10 according to an embodiment of the disclosure.

Figure 4:
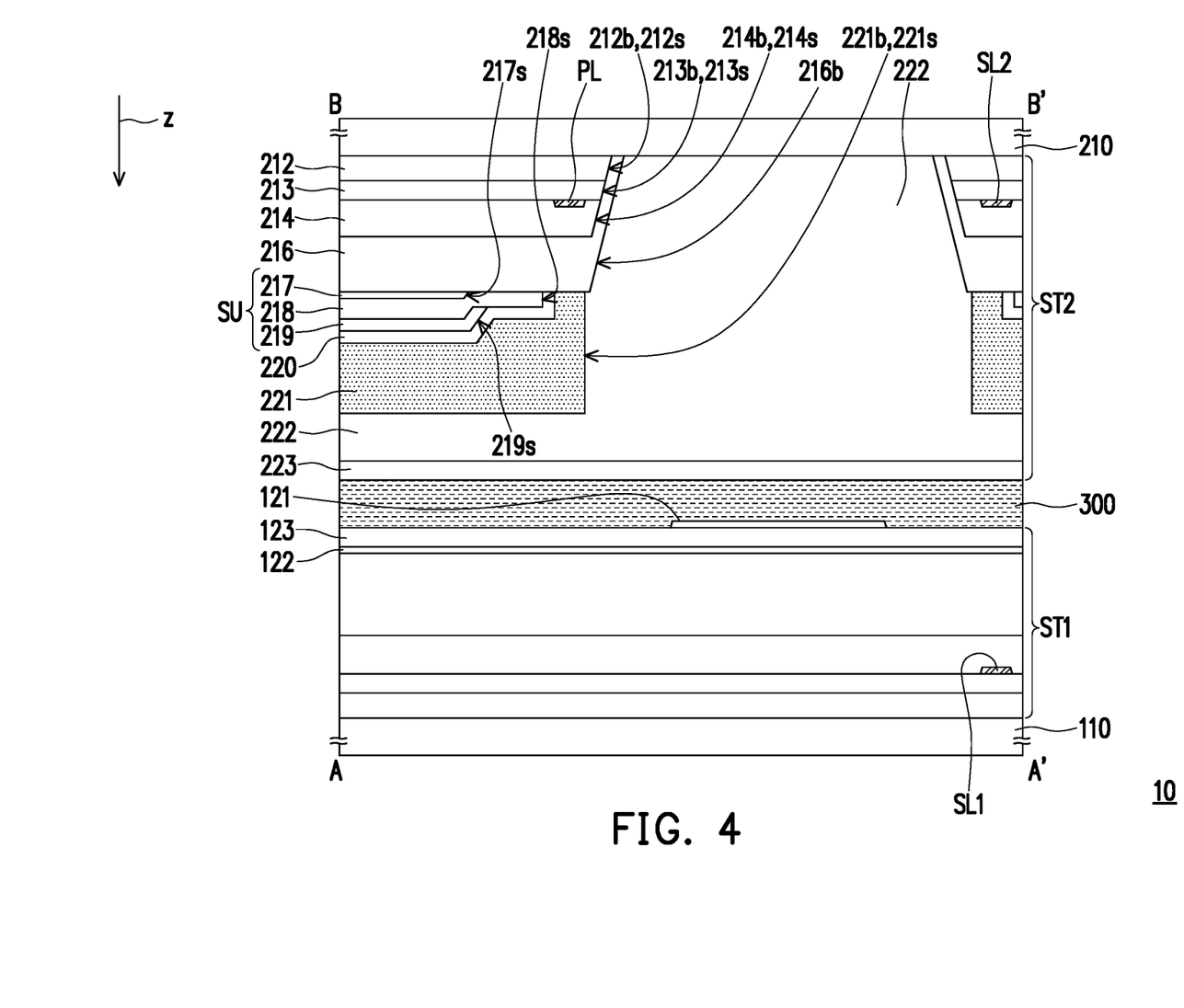
FIG. 4 is a schematic cross-sectional view of the display apparatus 10 according to an embodiment of the disclosure.

FIG. 4 is a schematic cross-sectional view of the display apparatus 10 according to an embodiment of the disclosure. FIG. 4 corresponds to the section line A-A' of FIG. 2 and the section line B-B' of FIG. 3.

A common electrode layer 122 of FIG. 4 is omitted from FIG. 2.

Figure 5:
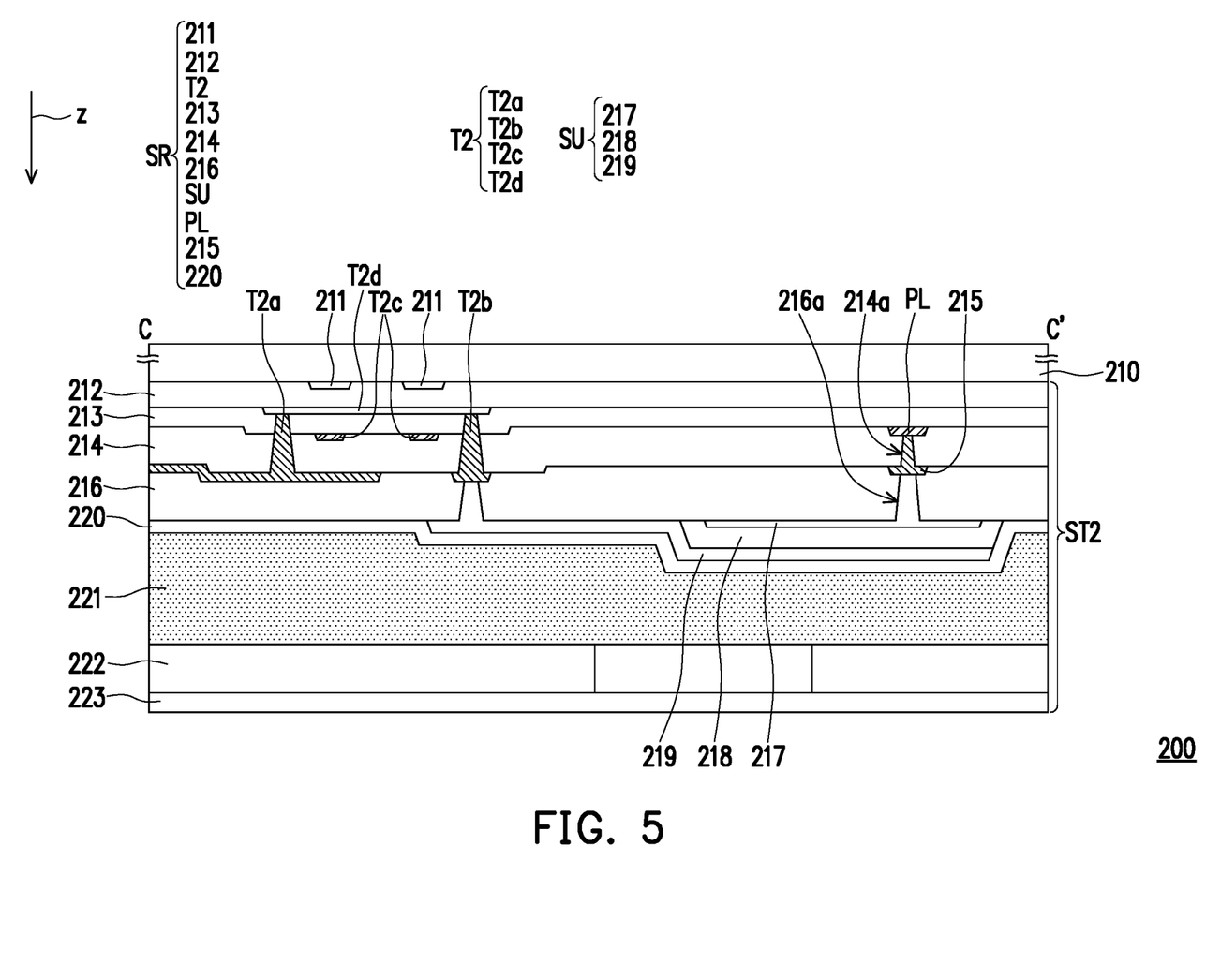
FIG. 5 is a schematic cross-sectional view of the sensing substrate 200 of the display apparatus 10 according to an embodiment of the disclosure.

FIG. 5 is a schematic cross-sectional view of the sensing substrate 200 of the display apparatus 10 according to an embodiment of the disclosure. FIG. 5 corresponds to the section line C-C' of FIG. 3.

Referring to FIG. 1, the display apparatus 10 includes the pixel array substrate 100, the sensing substrate 200, and a display medium 300. The display medium 300 is located between the sensing substrate 200 and the pixel array substrate 100. The sensing substrate 200, the display medium 300, and the pixel array substrate 100 are sequentially arranged in a direction z. For example, in this embodiment, the display medium 300 may be liquid crystal, but the disclosure is not limited thereto.

Referring to FIG. 1 and FIG. 4, the pixel array substrate 100 includes a first substrate 110 and a first stacked structure ST1 disposed on the first substrate 110, wherein the first stacked structure ST1 is located between the first substrate 110 and the display medium 300.

Referring to FIG. 2 and FIG. 4, in this embodiment, the first stacked structure ST1 of the pixel array substrate 100 includes a display element layer AR. The display element layer AR includes a plurality of pixel structures PX, a plurality of data lines DL, and a plurality of first scan lines SL1. Each pixel structure PX includes an active device T1 and a pixel electrode 121 electrically connected to the active device T1. The active device T1 includes a pixel transistor. The pixel transistor has a control terminal T1c, a semiconductor pattern T1d, a first terminal T1a, and a second terminal T1b. The control terminal T1c is electrically connected to a corresponding first scan line SL1. Two different regions of the semiconductor pattern T1d are electrically connected to the first terminal T1a and the second terminal T1b, respectively. The first terminal T1a is electrically connected to a corresponding data line DL, and the second terminal T1b is electrically connected to the pixel electrode 121.

In this embodiment, each pixel structure PX further includes a common electrode layer 122, and the potential difference between the common electrode layer 122 and the pixel electrode 121 is used to drive the display medium 300 so that the display apparatus 10 can display images.

For example, in this embodiment, the common electrode layer 122 and the pixel electrode 121 may be disposed on the same substrate (for example, on the first substrate 110). A dielectric layer 123 is sandwiched between the common electrode layer 122 and the pixel electrode 121. One of the common electrode layer 122 and the pixel electrode 121 has a plurality of slits 121a, and the other of the common electrode layer 122 and the pixel electrode 121 overlaps the slits 121a.

In short, in this embodiment, the display apparatus 10 may be a display panel of the Fringe-Field Switching (FFS) mode integrated with a fingerprint recognition function. However, the disclosure is not limited thereto. In other embodiments, the display apparatus 10 may also be a display panel of other modes integrated with a fingerprint recognition function.

In this embodiment, the material of the first substrate 110 may be glass, quartz, organic polymers, opaque/reflective materials (for example, wafer, ceramics, or other suitable materials), or other suitable materials.

In this embodiment, considering conductivity, the control terminal T1c, the first terminal T1a, and the second terminal T1b of the pixel transistor of the active device T1, the first scan line SL1, and the data line DL are made of metal materials. However, the disclosure is not limited thereto. According to other embodiments, the control terminal T1c, the first terminal T1a, and the second terminal T1b of the pixel transistor of the active device T1, the first scan line SL1 and/or the data line DL may also be made of other conductive materials, such as alloys, nitrides of metal materials, oxides of metal materials, oxynitrides of metal materials, or a stacked layer of metal materials and other conductive materials.

In this embodiment, the semiconductor pattern T1d of the pixel transistor is, for example, polysilicon. However, the disclosure is not limited thereto. According to other embodiments, the semiconductor pattern T1d of the pixel transistor may also be amorphous silicon, microcrystalline silicon, single crystalline silicon, organic semiconductor materials, oxide semiconductor materials (for example, indium zinc oxides, indium gallium zinc oxides, other suitable materials, or a combination of the foregoing), other suitable materials, the foregoing materials containing a dopant, or a combination of the foregoing.

In this embodiment, the pixel electrode 121 is, for example, a transparent conductive layer, which includes metal oxides, such as indium tin oxides, indium zinc oxides, aluminum tin oxides, aluminum zinc oxides, indium germanium zinc oxides, other suitable oxides, or a stacked layer of at least two of the foregoing, but the disclosure is not limited thereto.

Referring to FIG. 1, FIG. 3, and FIG. 4, the sensing substrate 200 includes a second substrate 210 and a second stacked structure ST2 disposed on the second substrate 210. The second substrate 210 is disposed opposite to the first substrate 110. The display medium 300 is disposed between the first substrate 110 and the second substrate 210. The first stacked structure ST1 is located between the first substrate 110 and the display medium 300. The second stacked structure ST2 is located between the second substrate 210 and the display medium 300.

In this embodiment, the second substrate 210 is a light-transmitting substrate, and the material thereof may be glass, quartz, organic polymers, or other suitable materials.

Referring to FIG. 3, FIG. 4, and FIG. 5, the second stacked structure ST2 of the sensing substrate 200 includes a sensing element layer SR. The sensing element layer SR includes a plurality of read-out transistors T2, a plurality of light-sensing structures SU electrically connected to the read-out transistors T2 respectively, a plurality of power lines PL, a plurality of read lines RL, and a plurality of second scan lines SL2.

The read-out transistors T2 are disposed between the second substrate 210 and the display medium 300. Each read-out transistor T2 has a control terminal T2c, a semiconductor pattern T2d, a first terminal T2a, and a second terminal T2b. The control terminal T2c is electrically connected to a corresponding second scan line SL2. Two different regions of the semiconductor pattern T2d are electrically connected to the first terminal T2a and the second terminal T2b, respectively. The first terminal T2a is electrically connected to a corresponding read line RL, and the second terminal T2b is electrically connected to a corresponding light-sensing structure SU.

In this embodiment, considering conductivity, the control terminal T2c, the first terminal T2a, and the second terminal T2b of the read-out transistor T2, the second scan line SL2, the read line RL, and the power line PL are made of metal materials. However, the disclosure is not limited thereto. According to other embodiments, the control terminal T2c, the first terminal T2a, and the second terminal T2b of the read-out transistor T2, the second scan line SL2, the read line RL and/or the power line PL may also be made of other conductive materials, such as alloys, nitrides of metal materials, oxides of metal materials, oxynitrides of metal materials, or stacked layers of metal materials and other conductive materials.

In this embodiment, the semiconductor pattern T2d of the read-out transistor T2 is, for example, polysilicon. However, the disclosure is not limited thereto. According to other embodiments, the semiconductor pattern T2d of the read-out transistor T2 may also be amorphous silicon, microcrystalline silicon, single crystalline silicon, organic semiconductor materials, oxide semiconductor materials (for example, indium zinc oxides, indium gallium zinc oxides, other suitable materials, or a combination of the foregoing), other suitable materials, the foregoing materials containing a dopant, or a combination of the foregoing.

The sensing element layer SR further includes a first insulating layer 213 disposed between the semiconductor pattern T2d and the control terminal T2c of the read-out transistor T2. The first insulating layer 213 may also be called a gate insulating layer.

In this embodiment, the material of the first insulating layer 213 may be inorganic materials (for example, silicon oxides, silicon nitrides, silicon oxynitrides, or a stacked layer of at least two of the foregoing materials), organic materials, or a combination of the foregoing.

In this embodiment, the sensing element layer SR may selectively include a third insulating layer 214, which is disposed between the control terminal T2c and the first terminal T2a of the read-out transistor T2. The third insulating layer 214 is also disposed between the control terminal T2c and the second terminal T2b of the read-out transistor T2. The third insulating layer 214 may also be called an interlayer insulating layer.

In this embodiment, the material of the third insulating layer 214 may be inorganic materials (for example, silicon oxides, silicon nitrides, silicon oxynitrides, or a stacked layer of at least two of the foregoing materials), organic materials, or a combination of the foregoing.

In this embodiment, the sensing element layer SR may selectively include a light-blocking pattern 211 and a buffer layer 212. The light-blocking pattern 211 is disposed on the second substrate 210. The buffer layer 212 is disposed on the light-blocking pattern 211 and the second substrate 210, and the light-blocking pattern 211 is located between the second substrate 210 and the buffer layer 212.

In this embodiment, the read-out transistor T2 may be disposed on the buffer layer 212. The buffer layer 212 is located between the light-blocking pattern 211 and the read-out transistor T2, and the light-blocking pattern 211 shields the semiconductor pattern T2d of the read-out transistor T2.

In this embodiment, the sensing element layer SR may selectively include a second insulating layer 216 disposed between the read-out transistor T2 and the light-sensing structure SU. The second insulating layer 216 may also be called a flat layer.

In this embodiment, the material of the second insulating layer 216 may be inorganic materials (for example, silicon oxides, silicon nitrides, silicon oxynitrides, or a stacked layer of at least two of the foregoing materials), organic materials, or a combination of the foregoing.

Each light-sensing structure SU includes a first electrode 217, a second electrode 219, and a light-sensing pattern layer 218 disposed between the first electrode 217 and the second electrode 219. In this embodiment, the first electrode 217, the light-sensing pattern layer 218, and the second electrode 219 may be sequentially arranged on the second insulating layer 216 in the direction z.

In this embodiment, the first electrode 217 of the light-sensing structure SU is electrically connected to the power line PL. For example, in this embodiment, the power line PL is disposed on the first insulating layer 213, and the power line PL is located between the first insulating layer 213 and the third insulating layer 214. The sensing element layer SR may further include a transfer pattern 215. The transfer pattern 215 is disposed on the third insulating layer 214 and is electrically connected to the power line PL through a contact window 214a of the third insulating layer 214. The second insulating layer 216 is disposed on the transfer pattern 215 and the third insulating layer 214. The transfer pattern 215 is located between the third insulating layer 214 and the second insulating layer 216. The first electrode 217 of the light-sensing structure SU is disposed on the second insulating layer 216 and is electrically connected to the transfer pattern 215 through a contact window 216a of the second insulating layer 216.

In this embodiment, the first electrode 217 of the light-sensing structure SU is a light-transmitting electrode, and the material thereof is, for example, indium tin oxides; the material of the light-sensing pattern layer 218 of the light-sensing structure SU is, for example, silicon-rich oxides (SRO); and the second electrode 219 of the light-sensing structure SU is a reflective electrode, and the material thereof is, for example, metals. However, the disclosure is not limited thereto.

In this embodiment, the sensing element layer SR may further include a fourth insulating layer 220. The fourth insulating layer 220 covers the light-sensing structure SU, and the light-sensing structure SU is located between the second insulating layer 216 and the fourth insulating layer 220.

In this embodiment, the second stacked structure ST2 of the sensing substrate 200 may further include a plurality of color filter patterns 222. The color filter patterns 222 are disposed between the second substrate 210 and the display medium 300. Specifically, in this embodiment, the color filter patterns 222 are disposed between the light-sensing element layer SR and the display medium 300. For example, in this embodiment, the color filter patterns 222 may include red filter patterns, green filter patterns, and blue filter patterns, but the disclosure is not limited thereto.

Referring to FIG. 2, FIG. 3, and FIG. 4, in this embodiment, the second stacked structure ST2 of the sensing substrate 200 may further include a light-shielding pattern layer 221. The light-shielding pattern layer 221 is disposed between the second substrate 210 and the color filter pattern 222. In this embodiment, the light-shielding pattern layer 221 is disposed between the light-sensing element layer SR and the color filter patterns 222. The light-shielding pattern layer 221 shields the active devices T1 of the pixel structures PX, the data lines DL, and the first scan lines SL1, and has a plurality of openings 221b overlapping the pixel electrodes 121, respectively. The light-shielding pattern layer 221 is commonly known as a black matrix. In this embodiment, the material of the light-shielding pattern layer 221 is, for example, black resin, but the disclosure is not limited thereto.

Referring to FIG. 3, FIG. 4, and FIG. 5, in this embodiment, the second stacked structure ST2 of the sensing substrate 200 may further include a protective layer 223. The protective layer 223 covers the color filter patterns 222 and is located between the color filter patterns 222 and the display medium 300.

In this embodiment, the material of the protective layer 223 may be inorganic materials (for example, silicon oxides, silicon nitrides, silicon oxynitrides, or a stacked layer of at least two of the foregoing materials), organic materials, or a combination of the foregoing.

Referring to FIG. 2, FIG. 3, FIG. 4, and FIG. 5, it is worth noting that, the first insulating layer 213 of the sensing element layer SR has an opening 213b located outside the light-sensing structure SU, and the color filter pattern 222 fills the opening 213b of the first insulating layer 213. In this embodiment, the opening 213b of the first insulating layer 213 overlaps the opening 221b of the light-shielding pattern layer 221. In this embodiment, the opening 213b of the first insulating layer 213 also overlaps the pixel electrode 121.

Since the first insulating layer 213 of the sensing element layer SR has the opening 213b, the display beam (not shown) from the display medium 300 may not pass through the physical part of the first insulating layer 213 when passing through the sensing substrate 200. Therefore, the problem of shift of white point coordinates resulting from the display beam passing through the sensing element layer SR can be improved.

In addition, in this embodiment, the buffer layer 212 of the sensing element layer SR may have an opening 212b located outside the light-sensing structure SU, the third insulating layer 214 of the sensing element layer SR may have an opening 214b located outside the light-sensing structure SU, and the second insulating layer 216 of the sensing element layer SR may have an opening 216b located outside the light-sensing structure SU. The opening 212b of the buffer layer 212, the opening 214b of the third insulating layer 214, and the opening 216b of the second insulating layer 216 overlap the opening 213b of the first insulating layer 213. In this embodiment, the color filter pattern 222 not only fills the opening 213b of the first insulating layer 213 but also fills the opening 212b of the buffer layer 212, the opening 214b of the third insulating layer 214, and the opening 216b of the second insulating layer 216.

In this embodiment, the buffer layer 212 has a side wall 212s defining the opening 212b, the first insulating layer 213 has a side wall 213s defining the opening 213b, and the third insulating layer 214 has a side wall 214s defining the opening 214b. The second insulating layer 216 may cover the side wall 212s of the buffer layer 212, the side wall 213s of the first insulating layer 213, and the side wall 214s of the third insulating layer 214.

In addition, in this embodiment, the light-shielding pattern layer 221 may cover the side wall 217s of the first electrode 217 of the light-sensing structure SU, the side wall 218s of the light-sensing pattern layer 218, and the side wall 219s of the second electrode 219. In this embodiment, the color filter pattern 222 may cover the side wall 221s of the light-shielding pattern layer 221, and the color filter pattern 222 covers the side wall 217s of the first electrode 217 of the light-sensing structure SU, the side wall 218s of the light-sensing pattern layer 218, and the side wall 219s of the second electrode 219.

It should be noted here that the following embodiments also use the reference numerals and part of the content of the foregoing embodiment, wherein the same reference numerals are used to denote the same or similar elements, and the description of the same technical content is omitted. Please refer to the foregoing embodiment for the description of the omitted part, which will not be repeated hereinafter.

Figure 6:
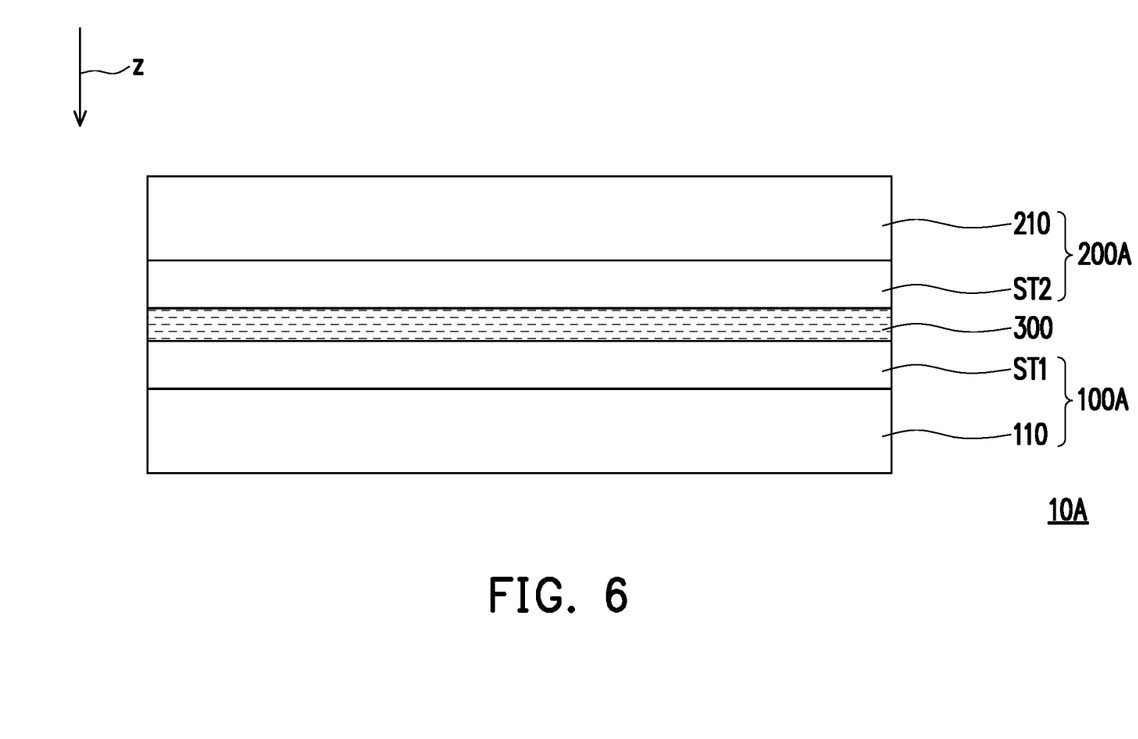
FIG. 6 is a schematic cross-sectional view of a display apparatus 10A according to an embodiment of the disclosure.

FIG. 6 is a schematic cross-sectional view of a display apparatus 10A according to an embodiment of the disclosure.

Figure 7:
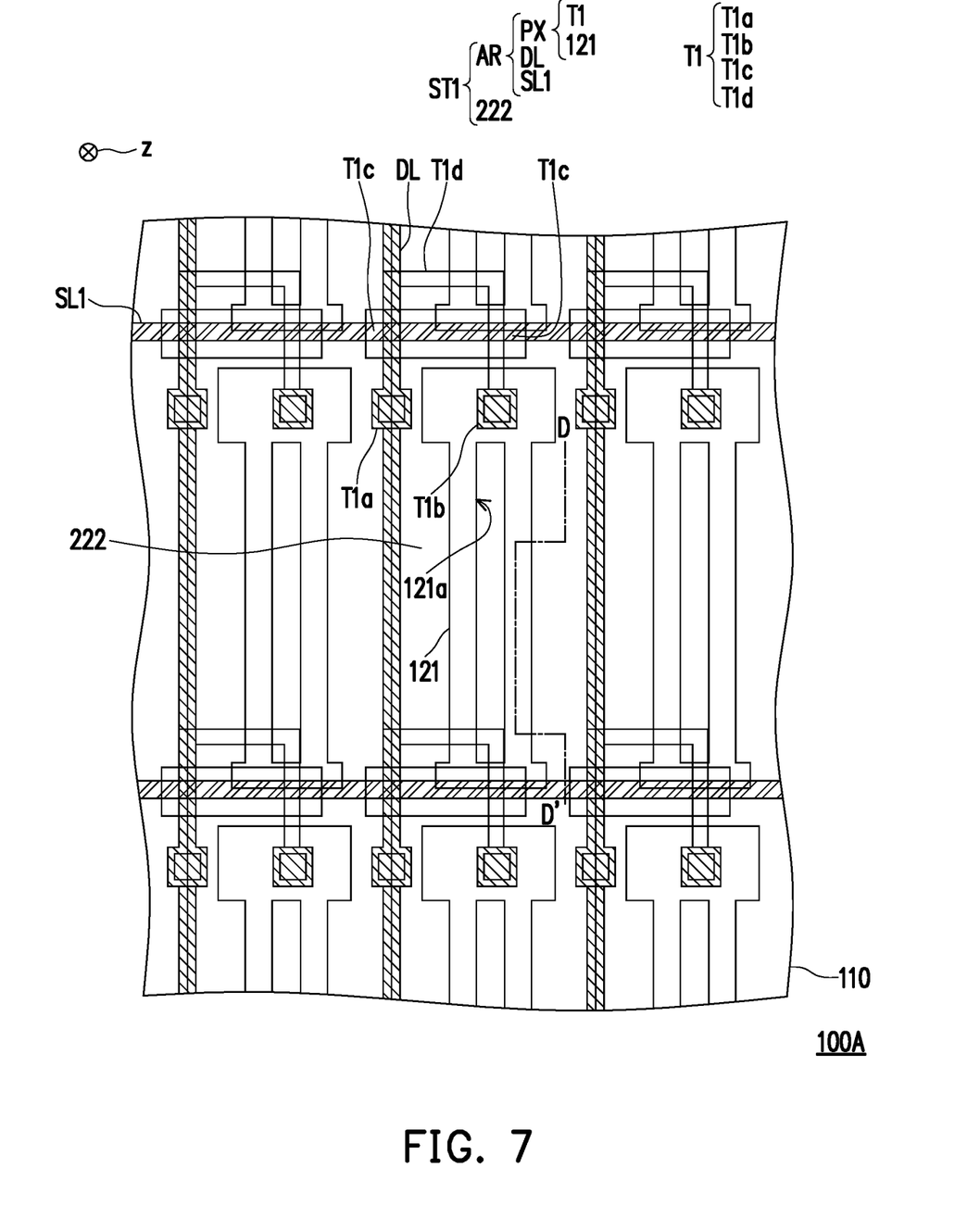
FIG. 7 is a schematic top perspective view of a pixel array substrate 100A of the display apparatus 10A according to an embodiment of the disclosure.

FIG. 7 is a schematic top perspective view of a pixel array substrate 100A of the display apparatus 10A according to an embodiment of the disclosure.

Figure 8:
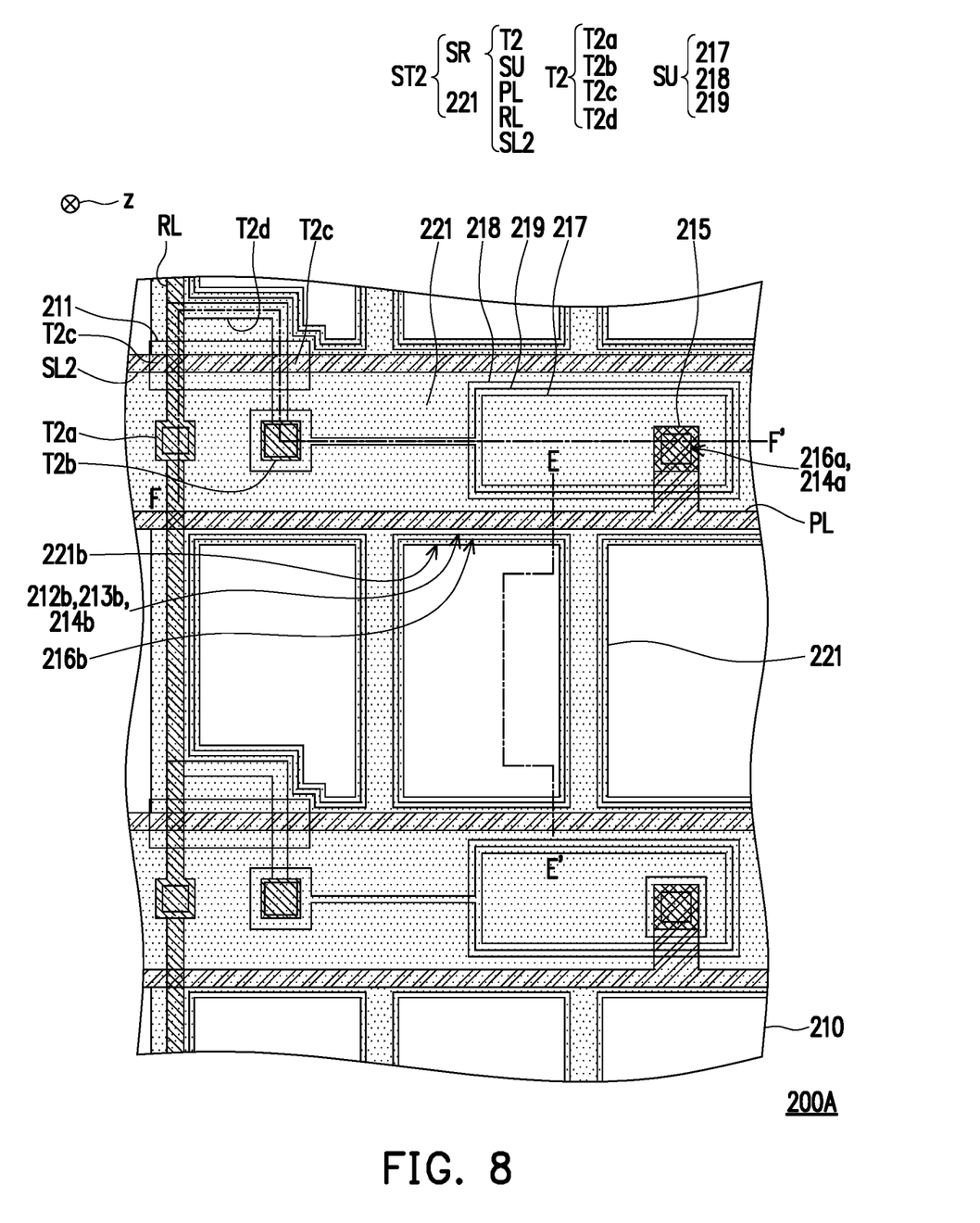
FIG. 8 is a schematic top perspective view of a sensing substrate 200A of the display apparatus 10A according to an embodiment of the disclosure.

FIG. 8 is a schematic top perspective view of a sensing substrate 200A of the display apparatus 10A according to an embodiment of the disclosure.

Figure 9:
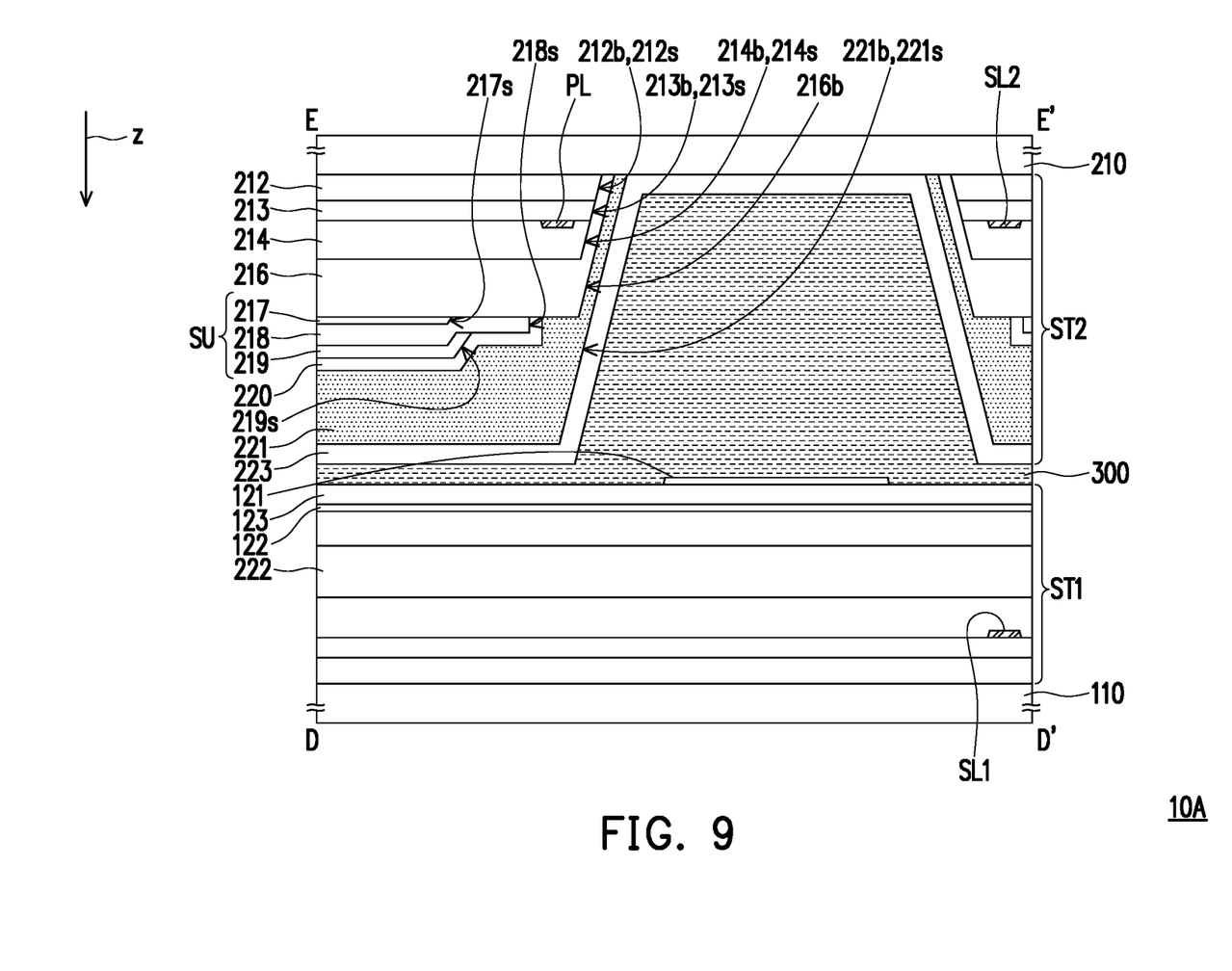
FIG. 9 is a schematic cross-sectional view of the display apparatus 10A according to an embodiment of the disclosure.

FIG. 9 is a schematic cross-sectional view of the display apparatus 10A according to an embodiment of the disclosure. FIG. 9 corresponds to the section line D-D' of FIG. 7 and the section line E-E' of FIG. 8.

A common electrode layer 122 of FIG. 9 is omitted from FIG. 7.

Figure 10:
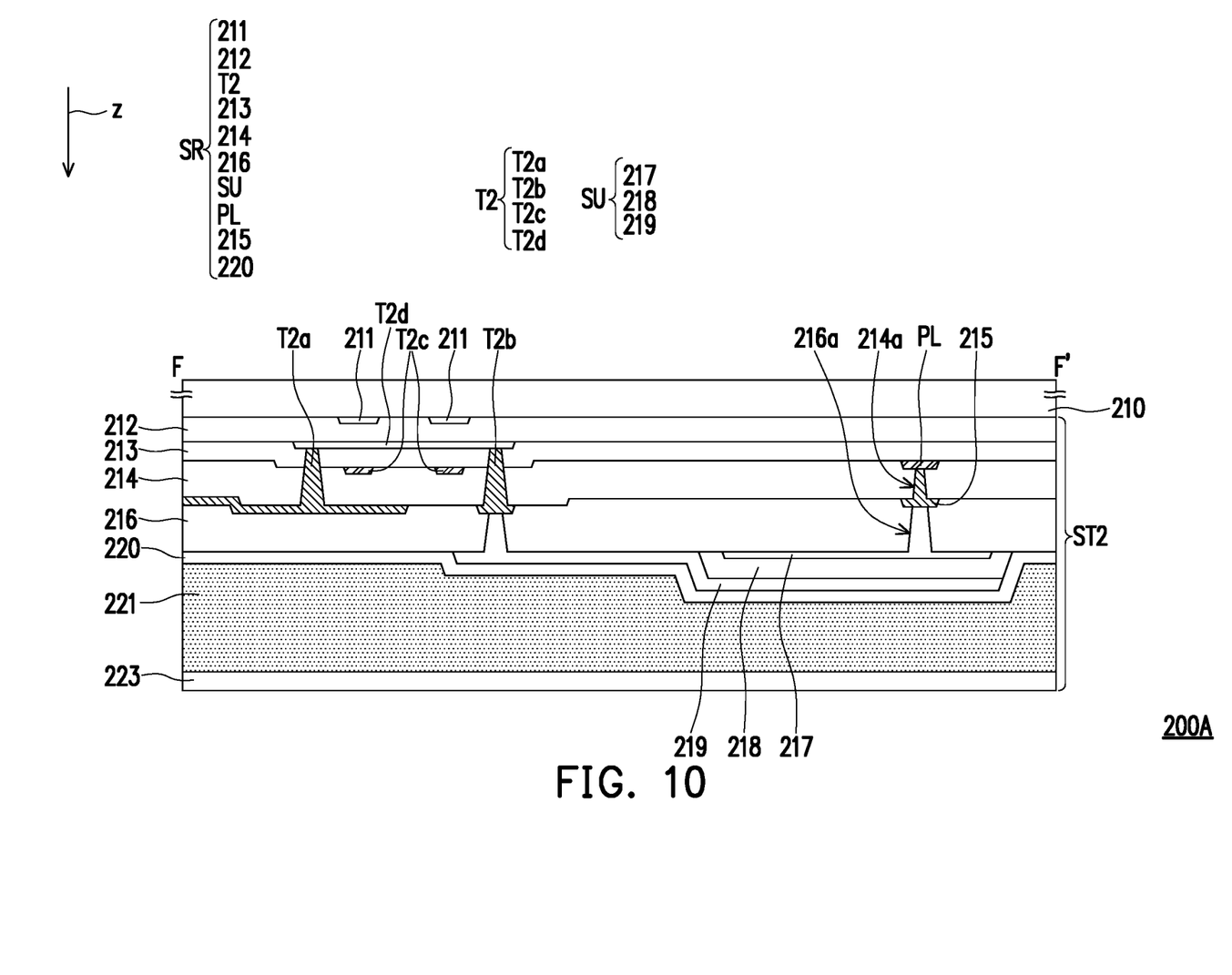
FIG. 10 is a schematic cross-sectional view of the sensing substrate 200A of the display apparatus 10A according to an embodiment of the disclosure.

FIG. 10 is a schematic cross-sectional view of the sensing substrate 200A of the display apparatus 10A according to an embodiment of the disclosure. FIG. 10 corresponds to the section line F-F' of FIG. 8.

The display apparatus 10A of this embodiment is similar to the aforementioned display apparatus 10, and the difference is that: in the display apparatus 10, the sensing substrate 200 includes the color filter patterns 222, but in the display apparatus 10A of this embodiment, a pixel array substrate 100A includes the color filter patterns 222.

Referring to FIG. 9, specifically, in this embodiment, the color filter pattern 222 is disposed between the first substrate 110 and the display medium 300. Furthermore, in this embodiment, the color filter pattern 222 may be disposed between the pixel electrode 121 and the first substrate 110.

The color filter pattern 222 located on the first substrate 110 overlaps the opening 213b of the first insulating layer 213 of the sensing element layer SR. In this embodiment, the color filter pattern 222 also overlaps the opening 212b of the buffer layer 212, the opening 214b of the third insulating layer 214, and the opening 216b of the second insulating layer 216.

The light-shielding pattern layer 221 is disposed between the second substrate 210 and the protective layer 223. The first insulating layer 213 is disposed between the second substrate 210 and the light-shielding pattern layer 221. In this embodiment, the protective layer 223 is disposed in the opening 213b of the first insulating layer 213 and the opening 221b of the light-shielding pattern layer 221. The protective layer 223 is further disposed in the opening 212b of the buffer layer 212, the opening 214b of the third insulating layer 214, and the opening 216b of the second insulating layer 216, and the protective layer 223 contacts the second substrate 210.

In addition, in this embodiment, the protective layer 223 covers the side wall 217s of the first electrode 217 of the light-sensing structure SU, the side wall 218s of the light-sensing pattern layer 218 of the light-sensing structure SU, and the side wall 219s of the second electrode 219 of the light-sensing structure SU.

The display apparatus 10A of this embodiment has functions and advantages similar to those of the aforementioned display apparatus 10, and will not be repeated here.

What is claimed is:

1. A display apparatus, comprising:
a first substrate;
a second substrate disposed opposite to the first substrate;
a display medium disposed between the first substrate and the second substrate;
a pixel structure disposed between the display medium and the first substrate;
a read-out transistor disposed between the second substrate and the display medium, wherein the read-out transistor has a semiconductor pattern and a control terminal;
a first insulating layer disposed between the semiconductor pattern of the read-out transistor and the control terminal of the read-out transistor;
a light-sensing structure disposed between the second substrate and the display medium and electrically connected to the read-out transistor; and
a color filter pattern disposed between the second substrate and the display medium, wherein the first insulating layer has an opening located outside the light-sensing structure, and the color filter pattern fills the opening of the first insulating layer.

2. The display apparatus according to claim 1, wherein the pixel structure comprises an active device and a pixel electrode electrically connected to the active device, and the opening of the first insulating layer overlaps the pixel electrode.

3. The display apparatus according to claim 2, further comprising:
a light-shielding pattern layer, wherein the light-sensing structure is located between the second substrate and the light-shielding pattern layer, the light-shielding pattern layer shields the active device of the pixel structure and has an opening overlapping the pixel electrode, and the opening of the first insulating layer further overlaps the opening of the light-shielding pattern layer.

4. The display apparatus according to claim 1, further comprising:
a light-shielding pattern layer, wherein the light-sensing structure is located between the second substrate and the light-shielding pattern layer, the light-sensing structure comprises a first electrode, a light-sensing pattern layer, and a second electrode stacked in sequence, and the light-shielding pattern layer covers a side wall of the first electrode, a side wall of the light-sensing pattern layer, and a side wall of the second electrode.

5. The display apparatus according to claim 4, wherein the light-shielding pattern layer is disposed between the second substrate and the color filter pattern, and the color filter pattern covers the side wall of the first electrode, the side wall of the light-sensing pattern layer, and the side wall of the second electrode.

6. The display apparatus according to claim 1, further comprising:
a second insulating layer disposed between the read-out transistor and the light-sensing structure, wherein the second insulating layer has an opening, the opening of the second insulating layer overlaps the opening of the first insulating layer, and the color filter pattern further fills the opening of the second insulating layer.

7. The display apparatus according to claim 6, wherein the first insulating layer has a side wall defining the opening of the first insulating layer, and the second insulating layer covers the side wall of the first insulating layer.

8. The display apparatus according to claim 6, wherein the read-out transistor further comprises a first terminal and a second terminal electrically connected to two different regions of the semiconductor pattern respectively, and the display apparatus further comprises:
a third insulating layer disposed between the control terminal and the first terminal of the read-out transistor, wherein the third insulating layer has an opening, the opening of the third insulating layer overlaps the opening of the first insulating layer, and the color filter pattern further fills the opening of the third insulating layer.

9. The display apparatus according to claim 8, wherein the third insulating layer has a side wall defining the opening of the third insulating layer, and the second insulating layer further covers the side wall of the third insulating layer.

10. A display apparatus, comprising:
a first substrate;
a second substrate disposed opposite to the first substrate;
a display medium disposed between the first substrate and the second substrate;
a pixel structure disposed between the display medium and the first substrate;
a read-out transistor disposed between the second substrate and the display medium, wherein the read-out transistor has a semiconductor pattern and a control terminal;
a first insulating layer disposed between the semiconductor pattern of the read-out transistor and the control terminal of the read-out transistor;
a light-sensing structure disposed between the second substrate and the display medium and electrically connected to the read-out transistor; and
a color filter pattern disposed between the first substrate and the display medium, wherein the first insulating layer has an opening located outside the light-sensing structure, and the color filter pattern overlaps the opening of the first insulating layer.

11. The display apparatus according to claim 10, wherein the pixel structure comprises an active device and a pixel electrode electrically connected to the active device, and the opening of the first insulating layer overlaps the pixel electrode.

12. The display apparatus according to claim 11, further comprising:
a light-shielding pattern layer, wherein the light-sensing structure is located between the second substrate and the light-shielding pattern layer, the light-shielding pattern layer shields the active device of the pixel structure and has an opening overlapping the pixel electrode, and the opening of the first insulating layer further overlaps the opening of the light-shielding pattern layer.

13. The display apparatus according to claim 10, further comprising:
a light-shielding pattern layer, wherein the light-sensing structure is located between the second substrate and the light-shielding pattern layer, the light-sensing structure comprises a first electrode, a light-sensing pattern layer, and a second electrode stacked in sequence, and the light-shielding pattern layer covers a side wall of the first electrode, a side wall of the light-sensing pattern layer, and a side wall of the second electrode.

14. The display apparatus according to claim 13, further comprising:
a protective layer, wherein the light-shielding pattern layer is disposed between the second substrate and the protective layer, and the protective layer covers the side wall of the first electrode, the side wall of the light-sensing pattern layer, and the side wall of the second electrode.

15. The display apparatus according to claim 10, further comprising:
a protective layer, wherein the first insulating layer is disposed between the second substrate and the protective layer, and the protective layer is disposed in the opening of the first insulating layer.

16. The display apparatus according to claim 10, further comprising:
a second insulating layer disposed between the read-out transistor and the light-sensing structure, wherein the second insulating layer has an opening, the opening of the second insulating layer overlaps the opening of the first insulating layer, and the color filter pattern further overlaps the opening of the second insulating layer.

17. The display apparatus according to claim 16, wherein the first insulating layer has a side wall defining the opening of the first insulating layer, and the second insulating layer covers the side wall of the first insulating layer.

18. The display apparatus according to claim 16, wherein the read-out transistor further comprises a first terminal and a second terminal electrically connected to two different regions of the semiconductor pattern respectively, and the display apparatus further comprises:
a third insulating layer disposed between the control terminal and the first terminal of the read-out transistor, wherein the third insulating layer has an opening, the opening of the third insulating layer overlaps the opening of the first insulating layer, and the color filter pattern further overlaps the opening of the third insulating layer.

* * * * *